United States Patent [19]

Cantenot

[11] Patent Number: 4,516,898

[45] Date of Patent: May 14, 1985

[54] DEVICES FOR EXTRACTING SOLID MATERIALS IN BULK IN THE FINELY DIVIDED STATE, FROM THE BOTTOM OF A SILO

[76] Inventor: Laurence Cantenot, 12, avenue de la Division Leclerc, 92340 Bourg la Reine, France

[21] Appl. No.: 354,283

[22] Filed: Mar. 3, 1982

[30] Foreign Application Priority Data

Mar. 12, 1981 [FR] France ............................ 81 04981

[51] Int. Cl.³ ............................................ B65G 65/42
[52] U.S. Cl. .................................... 414/309; 198/520; 198/735
[58] Field of Search ............... 414/306, 308, 309, 310, 414/311, 312; 198/520, 735

[56] References Cited

U.S. PATENT DOCUMENTS

| | | | |
|---|---|---|---|
| 409,568 | 8/1889 | Dodge | 198/520 X |
| 1,275,558 | 8/1918 | Holmgreen | 414/306 X |
| 1,338,514 | 4/1920 | Majerus | 198/735 X |
| 1,553,792 | 9/1925 | Redler | 414/142 |
| 1,744,933 | 1/1930 | Thoen | 198/735 X |
| 1,826,840 | 10/1931 | Sylvester | 414/132 |
| 2,529,954 | 11/1950 | McCann | 198/520 X |
| 3,229,665 | 1/1966 | Baltz | 414/306 X |
| 3,487,961 | 1/1970 | Neoenschwander | 414/310 X |
| 3,765,547 | 10/1973 | Shivvers | 414/310 X |
| 4,063,654 | 12/1977 | Shivvers | 414/310 X |
| 4,378,063 | 3/1983 | Silverthorn | 198/735 |

FOREIGN PATENT DOCUMENTS

| | | | |
|---|---|---|---|
| 595223 | 4/1934 | Fed. Rep. of Germany . | |
| 475556 | 5/1915 | France . | |
| 1578812 | 7/1964 | France | 414/306 |
| 2309442 | 11/1976 | France . | |
| 2348132 | 11/1977 | France . | |
| 1087407 | 10/1967 | United Kingdom | 414/310 |
| 1570690 | 7/1980 | United Kingdom | 414/312 |

Primary Examiner—Robert J. Spar
Assistant Examiner—Ken Muncy
Attorney, Agent, or Firm—Fisher, Christen & Sabol

[57] ABSTRACT

The invention relates to a device for completely evacuating a silo containing finely divided material in bulk. A mobile box element passes over the floor of the silo, its face corresponding to the direction of advance being open and the horizontal base forming a shovel for collecting the material remaining on the floor of the silo. The bottom of the box element has a conveyor with transverse bars for pushing the pulverulent or granulous material located on the bottom of the box element towards an outlet trap located at one end of the box element and maintained level with a pit for evacuation by gravity; the box element is moved to sweep the surface of the silo. The invention is particularly applicable to the final evacuation of the silo containing granulous material such as cereals.

4 Claims, 7 Drawing Figures

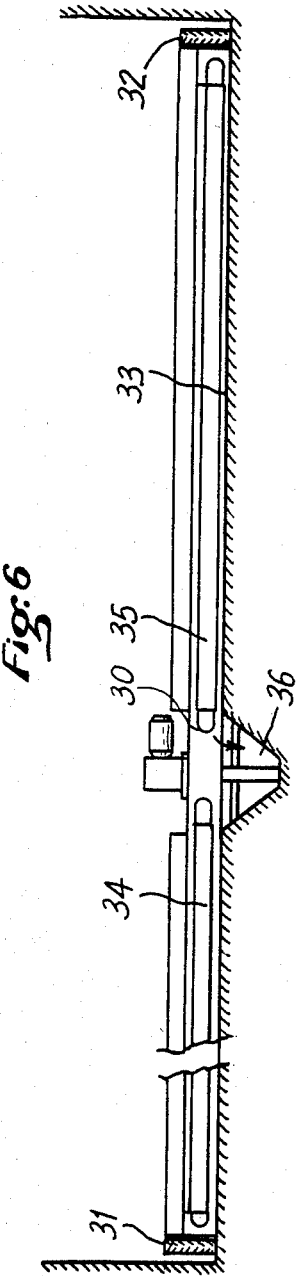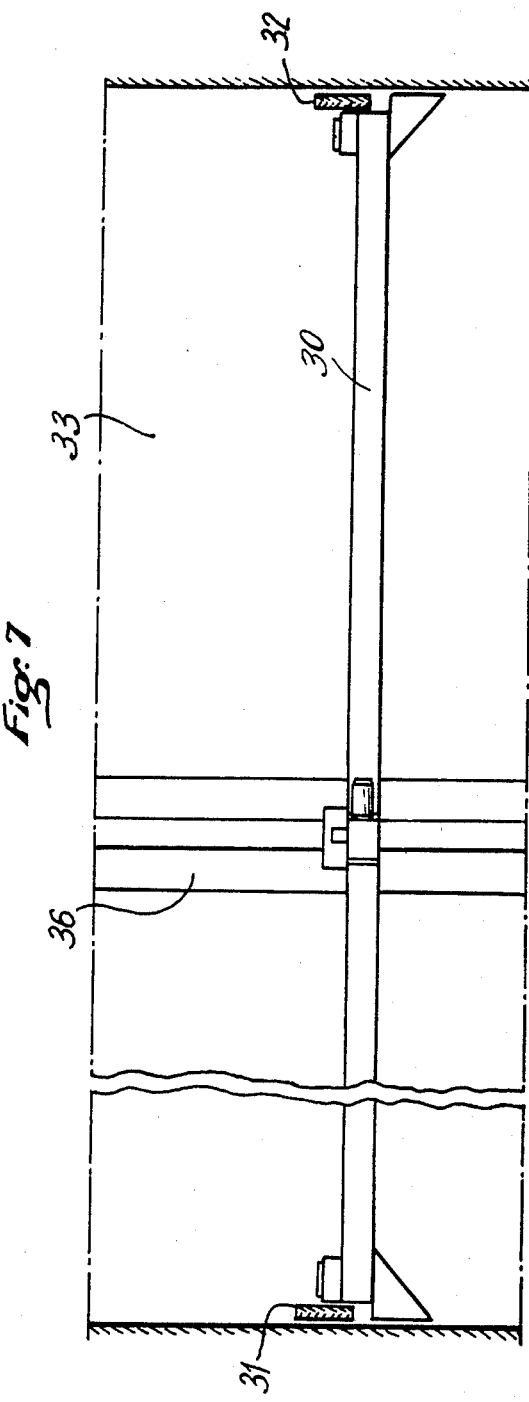

DEVICES FOR EXTRACTING SOLID MATERIALS IN BULK IN THE FINELY DIVIDED STATE, FROM THE BOTTOM OF A SILO

TECHNICAL FIELD

The present invention relates to a device for completely extracting the bulk material resting on the flat floor of a silo, the bulk material being in the finely divided state, for example in granular or pulverulent form.

The invention is applicable both to silos of which the bottom has a polygonal, and particularly quadrangular form, and to silos having a volume of revolution and a circular base.

The invention is more particularly applicable to the final evacuation of the residual bulk material remaining on the floor of the silo after the evacuation thereof by gravity, said bulk material must generally be swept by hand towards the evacuation orifice in order to ensure complete emptying of the silo.

BACKGROUND OF THE INVENTION

The necessity of resorting to a manual operation for finally emptying the silo represents a servitude, a source of slow execution and high cost price.

Various devices are known for mechanically ensuring final evacuation of the remaining granulous material when evacuation by gravity has ended.

Fixed or mobile pneumatic devices are known which automatically guide the mass of the grain remaining on the floor towards the evacuation orifices.

However, these devices are complex to place in position and represent considerable investment; in fact, it is necessary to provide a high blowing power, whilst this installation is called upon to function only over a very limited period of time corresponding to the complete evacuation of the silo.

Conveying means such as described in U.S. Pat. No. 1,826,840 and especially endless conveyors disposed parallel to the front of the heap and advancing towards the heap of the bulk material so as laterally to evacuate the said material are not suitable since they are likely to get stuck or jammed in the heap if their advance towards the heap is too fast and they are likely to rotate idly if their advance towards the heap is too slow; so that said endless conveyors must remain under the control of the staff especially where the heap of bulk material is not of regular shape, so as constantly to adapt the advance of the said conveyor towards the heap as a function of the evacuation flow; the evacuation conveyor must be allowed to advance towards the heap only to maintain the appropriate position of the conveyor with respect to the base of the heap being evacuated.

SUMMARY OF THE INVENTION

It is an object of the invention to provide a device for evacuating a silo, of any shape and volume, which requires only limited investment and which enables excellent conditions of yield and efficiency to be obtained. A further object of the invention is to provide an evacuating device which works automatically without staff control and where the advance of said device permits constant maximum yield of the evacuation.

The invention relates to a device for evacuating granular materials in bulk contained in a silo towards an evacuation orifice in the floor of the silo, of the type constituted by a linear structure, such as an arm, comprising mechanical driving means displacing it so as to pass over the floor of the silo and to sweep the surface thereof, said linear structure comprising conveying means for the evacuation of the material towards said evacuation orifice, wherein the said linear structure is constituted by a box shaped element comprising at least a bottom parallel and resting against the floor of the silo, a vertical rear side wall extending from one lateral edge of said bottom and an upper side substantially parallel to and above the bottom of the box element and forming a ceiling, the bottom of the box element comprising at one end a passage such as a trap for evacuation of the bulk material and situated above the said evacuation orifice in the floor of the silo, the box element containing the said conveying means and the said conveying means being adapted to discharge the bulk material penetrating in the box element and resting on the said bottom towards the evacuation passage and beyond to the evacuation orifice of the silo, the box element being displaced by said mechanical driving means so that the free edge of said bottom forming a shovel penetrates and enters the heap of bulk material causing the bulk material at the base of the heap to take its place on the said bottom from where it is discharged by the said conveying means.

Preferably the means for taking the granulous material over the bottom of the box element towards the trap located level with the evacuation orifice, are constituted by an endless conveyor constituted by at least one and preferably two cables mounted on two pulleys of which at least one is a driving pulley, the two pulleys being disposed at the two ends of the box element, the or each cable constituting the conveyor being associated with transverse bars scraping the bottom of the box element in the direction of the outlet trap.

In a preferred embodiment, wherein the silo takes the form of a cylindrical or truncated volume of revolution and comprises a circular base, the box element ensuring evacuation is disposed radially and it is associated with drive means for provoking its angular displacement and rotation about an axis concentric with respect to the circular floor of the silo, the conveyor being disposed so as to scrape the horizontal bottom of the box element located in the immediate vicinity of the floor of the silo, in a centripetal movement, in the direction of the outlet trap, located plumb with a central evacuation funnel for the silo, the rotating movement of the box element being adapted to sweep the floor of the silo in a circular movement.

According to another feature, the box element comprises a longitudinal housing in upper position and along the upper horizontal wall of the box element, this housing, open at each end, constituting a compartment for receiving the conveyor in its centrifugal return path and being isolated from the interior of the box element intended for the centripetal path of the grain taken along by the transverse bars of the conveyor in its centripetal movement.

According to a further feature of the invention, the box element is surmounted by an upper wall forming cover and disposed angularly, along at least one and preferably two opposite slopes forming a roof along a longitudinal edge parallel to the axis of the box element, this slanting cover making it possible to avoid stagnation of the grain on the box element.

According to a further feature, within the scope of the embodiment of the invention for evacuating a silo with circular base, the box element is supported at least at the centre of the circular floor of the silo by a pivot constituting its axis of rotation in its movement for angularly sweeping the floor of the silo, and the box element is supported at its opposite end, near the wall of the silo, by a driving wheel associated therewith and drive members.

According to a further feature, the box element comprises at the front end of its horizontal bottom, constituting the edge penetrating the pile in the movement of advance of the box element, a blade bearing by its edge on the floor of the silo and constituting a scraper shovel guiding the material towards the horizontal bottom of the box element where it is taken up by the drive devices.

According to another feature, the box element comprises, near each end passing along the wall of the silo, a deflector wall, disposed angularly with respect to the longitudinal axis of the box element and projecting with respect to the frontal edge of the mobile box element, this deflector wall joining the wall of the silo by its front terminal edge and being adapted to guide the granulous material located in the immediate vicinity of the vertical wall of the silo towards the open part of the box element.

According to a further feature, the horizontal wall forming the hollow ceiling of the box element comprises an adjustable canopy for adjusting the advance and position of the edge of the ceiling of the box element as a function of the nature of the material treated and the natural angle of the pile corresponding to this material.

BRIEF DESCRIPTION OF THE DRAWING

The invention will be more readily understood on reading the following description with reference to the accompanying drawings, in which:

FIG. 6 shows a view in transverse section of a silo with quadrangular base and provided, according to a variant, with the evacuation device according to the invention.

FIG. 7 shows a plan view of the silo of FIG. 6.

DETAILED DESCRIPTION

Figure 1:
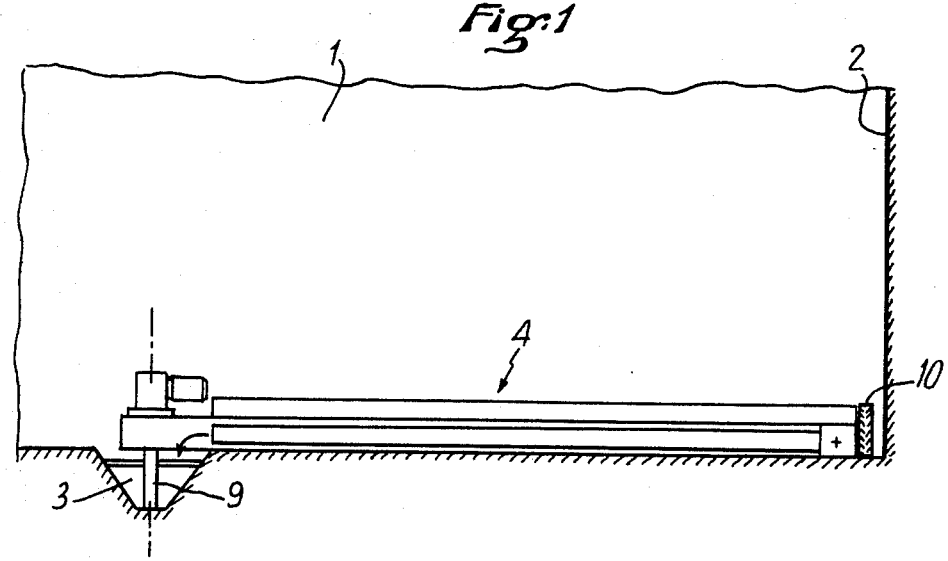
FIG. 1 shows a view in horizontal section of the bottom of a silo provided with an extraction device according to the invention.

Referring to FIGS. 1 to 5 inclusive, the invention is used for serving the interior 1 of a silo of which the walls 2 take the shape of a volume of revolution, for example a cylinder.

This silo is provided in known manner with a central opening 3 in the form of a funnel terminating in evacuation means (not shown) whence the grain is taken to be evacuated to the outside; in the initial phase of the emptying operation, the grain flows by gravity from the interior space 1 of the silo into the central funnel 3 and from there it is taken up by conventional conveyor means.

When the mass of the grain, for example cereals, ceases to flow by gravity up to funnel 3, a considerable mass of grains remains on the floor of the silo, which must then be evacuated, either by being shovelled manually or conveyed pneumatically; each of these solutions has the drawbacks which were mentioned hereinabove.

According to the invention, final evacuation of the residual pile of grains is ensured by an evacuation device constituted by a box 4 element disposed radially and adapted to move in a circular sweeping movement passing over the floor of the silo.

Figure 3:
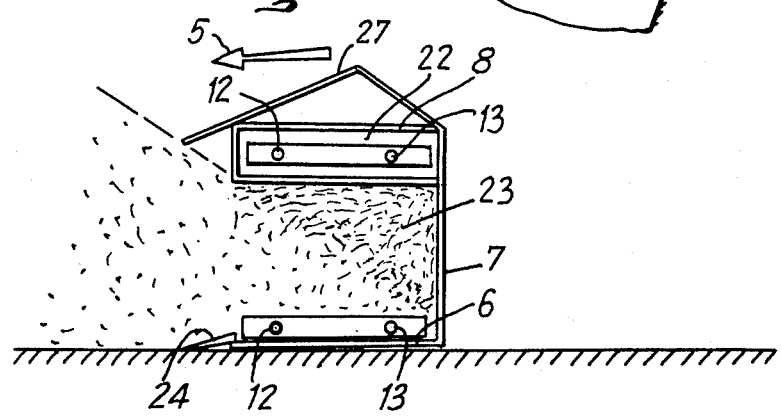
FIG. 3 shows a view in section of the extraction device shown in FIGS. 1 and 2.
Figure 4:
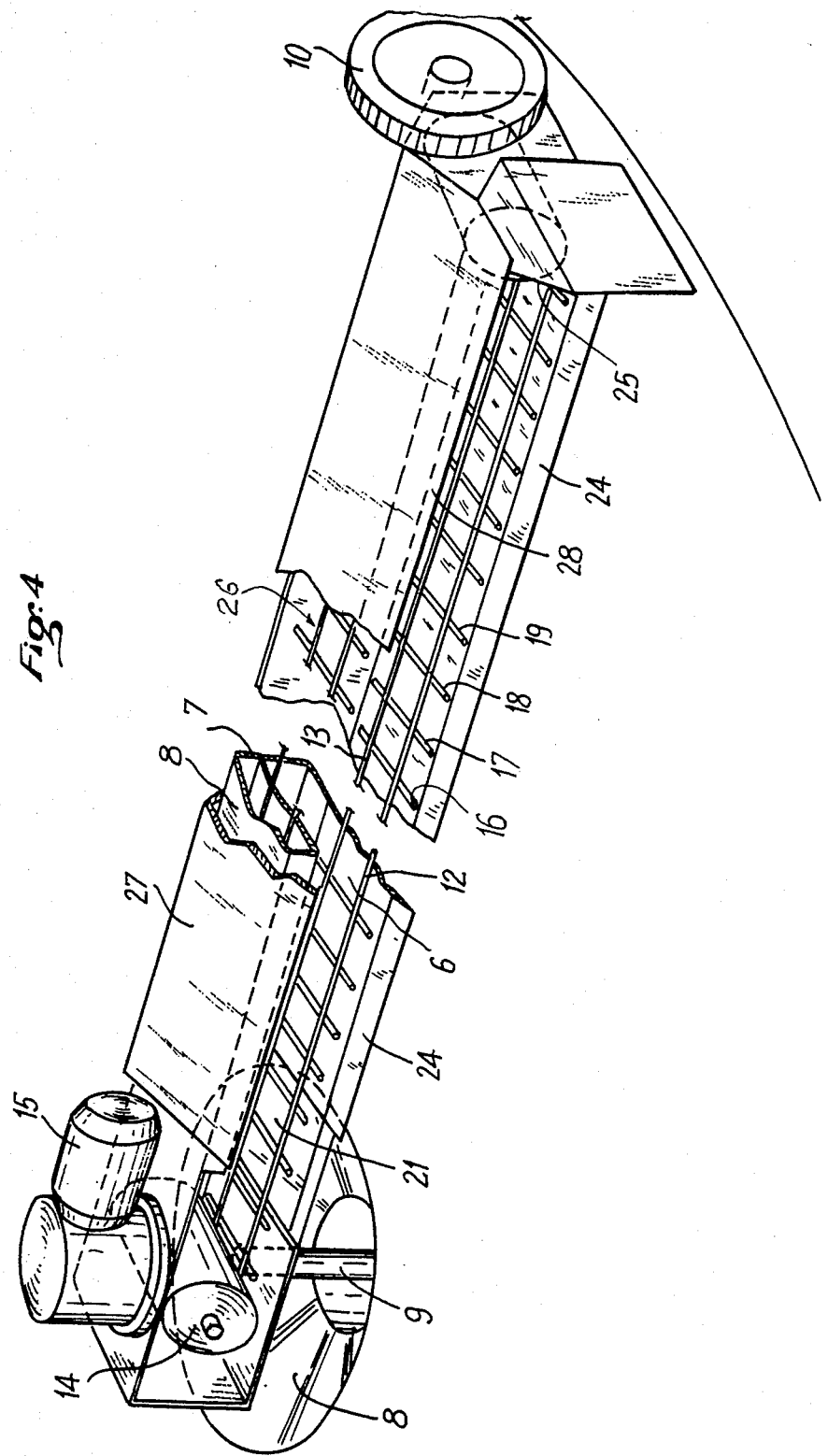
FIG. 4 shows a view in perspective of the extraction device of the preceding Figures.
Figure 5:
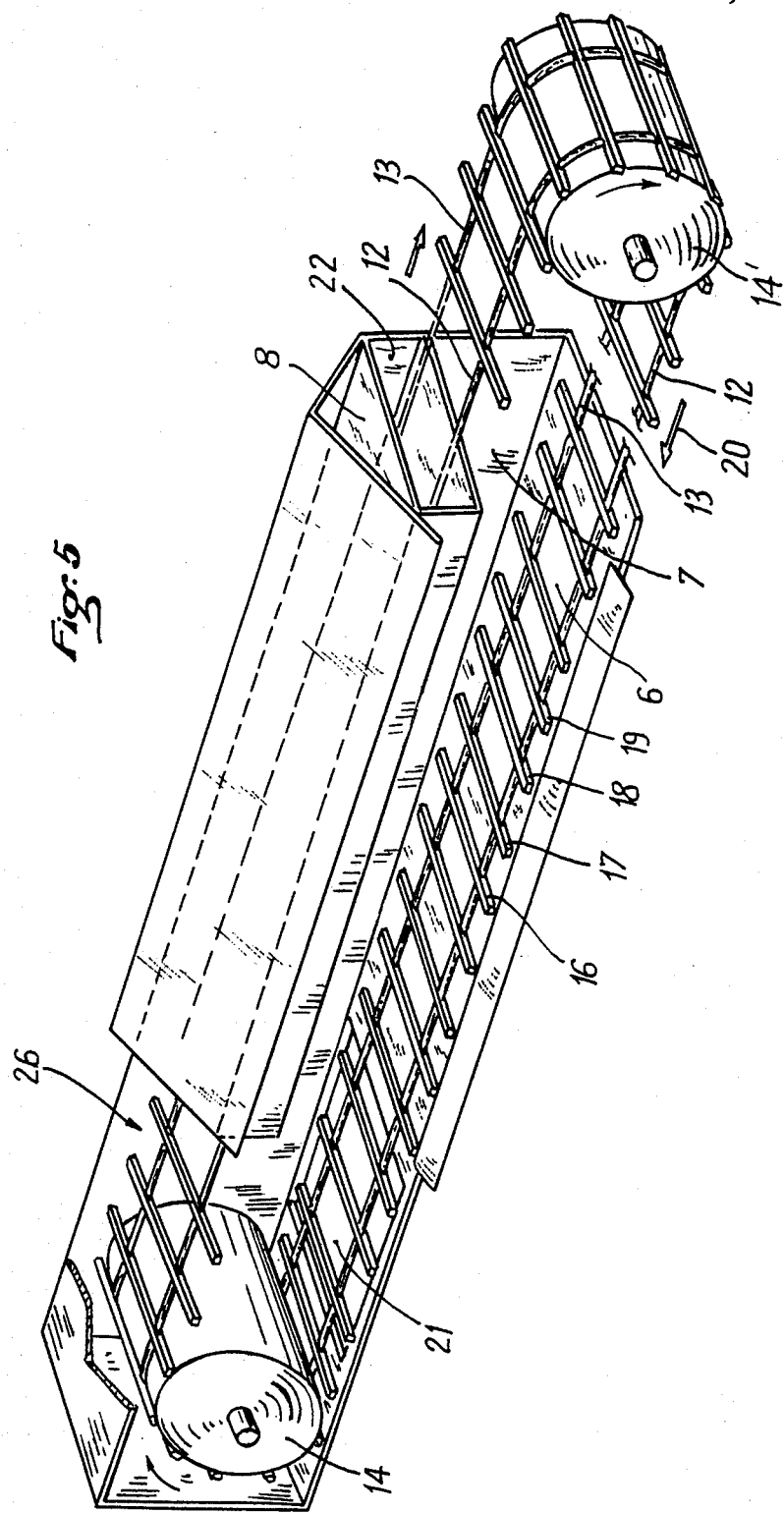
FIG. 5 shows a view in perspective of the extraction device placed in position in a silo with circular floor and as shown in FIGS. 1, 2 and 3.

The evacuation device is in the form of a box element seen in section in FIG. 3, said box element being open at its front or leading face corresponding to the direction of displacement as illustrated by arrow 5 (FIG. 3).

The box element is in the form of a U turned through 90°, so that the horizontally disposed side 6 constitutes the horizontal bottom of the box element, the base of the U, disposed vertically, constitutes the vertical wall of the box element, the upper horizontal side 8 constituting the ceiling of the box element.

Figure 2:
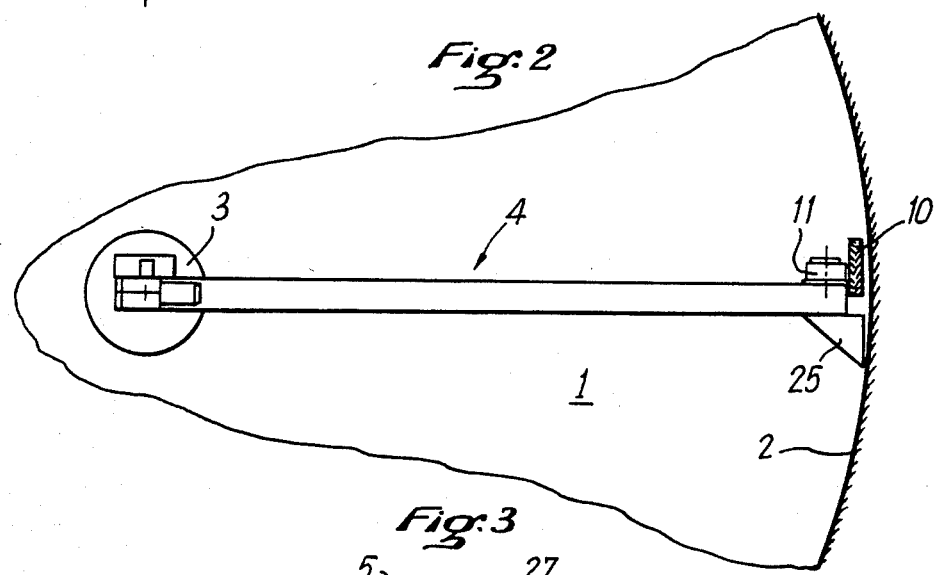
FIG. 2 shows a plan view of the bottom of the silo provided with its extraction device as shown in FIG. 1.

The box element is disposed radially as shown in FIG. 2 from the centre, plumb with respect to the evacuation funnel 3; at this level, the box element rests on the central pivot 9 constituting its axis of rotation.

At its opposite end located near the wall 2 of the silo, the box element comprises advance means, for example a wheel 10 with motor 11.

Means for taking up the weight of the box element, in the form of rollers or rails, may optionally be provided along the whole box element.

The drive wheel 10 may be replaced by any suitable mechanical, electrical or hydraulic drive system.

The open box element is provided with means for displacing the grain, in the form of a chain or cable conveyor 26; the two endless cables 12 and 13 are driven by a drive pulley 14, moved via suitable guides from the drive motor 15.

At the outer end of the box element, the conveyor is returned by a drum 14'.

On the two parallel cables 12,13 which rotate incessantly around the two pulleys 14 and 14', are mounted transverse bars 16,17, 18,19; the assembly formed by the bars mounted on the cables constitutes a conveyor of type known per se (reference 26).

The conveyor is mounted on the pulleys so as to pass over the bottom of the box in a centripetal direction (represented by arrow 20); thus, the longitudinal advance of the conveyor on the bottom of the box element scrapes this bottom and moves the grain located thereon towards the central end from where it escapes through the outlet trap 21 formed by a solution of continuity in the horizontal bottom 6 of the box element, plumb with the evacuation funnel 3.

The return of the conveyor from the top of the drive pulley 14 to the top of the guide pulley 14' in centrifugal direction is effected inside the longitudinal housing 22 disposed beneath the horizontal ceiling 8 of the box element; this housing 22 may be isolated with respect to the interior 23 of the box.

To facilitate the grain lifting from the floor of the silo to the interior of the box element, a blade 24 is disposed on the front edge of the horizontal bottom 6 of the box element, said blade scraping the floor of the silo by its front edge or lip and allowing, by a shovel effect, the slight rising movement of the grain located on the floor of the silo towards the interior of the box element where it is taken along by the scraper bars 16,17,18,19 towards the outlet 21 where the grain then follows the normal path of evacuation by gravity.

A deflector wall 25 is also provided at the outer end of the box element in the vicinity of the wall of the silo, so as to guide the grain located near this wall towards the interior of the box; this deflector wall 25 is located, frontally, opposite the terminal zone of the box element where the guide cylinder 14' is located, so that the horizontal deflector wall 25 guides the grain into the operational interior of the box element where the grain may be taken up by the conveyor generally designated by reference 26 and constituted by the two cables and transverse bars.

The box element may advantageously be provided on its upper ceiling 8 with a cover constituted by one and preferably two slopes forming a roof.

This two-slope cover 27 avoids any stagnation of grains which might remain on the box element.

The roof 27 may advantageously be provided with a canopy 28 which is adjustable so as to adjust the position of the edge of the ceiling of the box elements, as a function of the natural angle of the pile corresponding to each type of granulous material.

The arrangement of the evacuator according to the invention in the form of a box element open at a vertical face makes it possible, in fact, to avoid jamming the drive means constituted by the conveyor 26.

FIG. 3 shows that, taking into account the natural angle of the pile, the volume and weight of grains found on the conveyor belt is limited to a maximum, so that the drive means (the motor 15) may be calibrated so as to allow the drive of the quantity of grains located on the bottom 6 of the box element and subjected to the action of scraping and drive of the bars 16,17 of the conveyor belt 26.

As the evacuation clears a radial zone served by the box element, the latter advances angularly so as to displace the radial evacuation front as the grain is evacuated.

The device represents only a limited investment and ensures complete evacuation of a silo, under all conditions.

FIGS. 6 and 7 show a variant in which the box element 30 follows a linear movement, and to this effect it is provided with end drive wheels 31 and 32, enabling the box element to serve the floor 33 of a quadrangular silo by a transverse sweeping movement, the two symmetrical conveyors 34 and 35 taking the grain lying on the floor 33 into the central evacuation pit 36.

The box element according to the invention may advantageously be used for conveying air blown into the mass of the grain, thus ensuring aeration of the full silo. In this case, a plurality of box elements may be disposed in the same silo, thus accelerating the final evacuation operation.

The shape of the box element involves the existence of a bottom in the immediate vicinity of the floor of the silo to be evacuated, the horizontal bottom allowing a shovel effect and lifting the granulous or pulverulent material from the floor of the silo up to the horizontal bottom of the box element through which the drive means pass.

These drive means may be constituted by any useful device, for example by a worm screw which will advantageously be housed in a box element whose U-section has a curviform base, the circular section of the worm being inscribed in the curviform base, forming cradle or trough, of the box element; the box element then has a U-shaped section with curviform base, resting on one side.

In the case of a silo with a quadrangular base over which at least one movable arm passes, a device may be provided for causing a reciprocating (to and fro) displacement of the box element; the box element will then be operational in both the advance and return movement and, in this case, it will comprise two open front faces, each corresponding to a direction of advance of the box element.

The silo may comprise a plurality of scraping and evacuation members, either in the form of box elements or arms disposed radially in a silo with circular bottom, or in the form of transverse arms or box elements passing over the quadrangular floor of the silo in a linear movement.

In the case of a plurality of arms or box elements, one or more drive members may be provided, mounted on one box element, or driving box element, the other box elements being connected thereto by ties, tie rods, rods or the like, the groups of box elements then being driven by the driving box element.

The or each drive device of the driving box element may be constituted by any mechanical, hydraulic or like device. The drive wheel located at the end or ends of a box element may in particular be replaced by ratchet devices or the like of known type abutting either on the floor of the silo or on the case of the vertical walls located nearby.

The quantity of granulous or pulverulent materials which may penetrate inside the box element and be driven by the longitudinal evacuation means within the box element may be adjusted by varying the upper front edge of the box element; a canopy has thus been provided which is adjustable in length, but a shutter may also be used, which slides vertically in order partially to obturate the upper part of the open front wall of the box element, thus limiting the penetration of the pulverulent material inside the box element as a function of the angle of the natural pile formed by the material in question.

It will be understood that the device of the invention may be used in the case of silos containing materials of various characteristics both concerning their nature and their granulometry and homogeneity.

In general, the invention is applicable whenever solid materials are stored in bulk in a finely divided state, such as pulverulent or granulous products, and a fluid flow is allowed by the central evacuation traps or pits.

Although the use of a central evacuation trap or pit is more commonly widespread, two twin traps, located laterally, may also be provided, particularly in the case of a silo with a quadrangular base; in this case, the scraping and final evacuation box element comprises two traps each disposed level with the evacuation pit; the box element comprises two symmetrically disposed conveyors driven in an active centrifugal movement towards the lateral pits, the centrifugal path level with the bottom of the box element being associated with an inactive centripetal path corresponding to the return path.

In the case of materials whose natural fluidity is not sufficient to allow evacuation by gravity, the final evacuation device described here may be associated with a fluidised bed arrangement by blowing air from the bottom of the silo, perforated to this end, according to a technique known per se, the blowing of air through the perforated bottom of said silo allowing a fluidised bed arrangement of the remaining material and its final evacuation by the conveyor located in the box element.

The conveyor is essentially constituted by the transverse bars scraping the bottom, thus guiding the material towards the trap whence it is precipitated into the outlet pit where it is taken up by the conventional fixed evacuation means.

These transverse bars are mounted on one or more cables; the dimensions and nature of the cables depend on the efforts furnished by the conveyor and on the resistance (weight, friction, etc...) of the material thus evacuated.

Instead of the cables shown in the Figures, one or two chains may be used.

In the case of cables supporting the transverse bars, the cables are mounted between two end pulleys, the pulleys comprising, in known manner, notches for the insertion of the transverse scraper bars; in the case of the support for the transverse bars being constituted by a chain, the pulleys comprise, in known manner, lugs which engage inside the meshes to guide the path of the chain.

It is advantageous to adjust the speed of the driving wheel 10 so that the box element be constantly maintained against the base of the heap which prevents a further advance of the box element; the quantity of bulk material inside the box element is limited by the angle of the heap and the position of the front edge of the ceiling 27 and accordingly the quantity of bulk element inside the box element and subjected to the action of the conveying means, remains constant for a given product and a given position of the front edge of the ceiling 27; and in turn this constant quantity of the bulk material inside the box element makes it possible to obtain a constant flow of the bulk material delivered to the evacuation orifice and beyond to the downstream conveyors; this facilitates metering of the delivery, the quantity delivered for instance to a vessel or to a lorry being easily calculated as a function of the time. And furthermore there is never any risk for the conveying means in side the box element to be clogged by an excess of product.

Under the above circumstances, it is clear that the bulk material will substantially fill the box element, with pressure from the material still in the pile maintaining the box element full as material is conveyed to the evacuation orifice. Since material in the box element moves with the conveyor, new material from the pile enters substantially entirely from the end of the box element furthest from the evacuation orifice since portions of the conveyor returning toward the evacuation orifice are empty, as is readily apparent from the foregoing description of the operation, and thus fill when exposed along the open side. The result is substantially plug flow of material along the conveyor. The volume of space in the box element is shielded from the weight of any overlying material by the canopy, which therefore prevents any frictional resistance between the material in the box element and material above the canopy. Therefore, as the relatively small blades move the material that is directly between them, substantially all of the material above that material is moved along with the material directly between the blades. Thus, each blade moves far greater material than just that material directly between the blades, since the canopy and the pressure of material from the pile substantially prevents loss of material within the box element that is above the height of the blades.

What is claimed is:

1. A device, for removing a residual pile of granular or pulverulent matter from a silo, said device comprising:

a means for removing material;

a means for moving said means for removing material over a floor of a silo so as to sweep across said floor as said means for removing material moves, said means for removing material including a conveyor for pushing granular matter towards an evacuation orifice in said floor of said silo;

said means for removing material including an elongated box having a bottom side, a top side, and a vertical side interconnecting said top and bottom sides, said top and bottom sides being substantially parallel to said floor of said silo, said conveyor being enclosed within said elongated box, an upper surface of said bottom side being disposed slightly above said floor of said silo, and an open side of said elongated box which is open so that, when said elongated box is advanced toward a residual pile, material from said residual pile enters said elongated box;

said conveyor being an elongated loop having substantially parallel spaced apart upper and lower elongated sections; said conveyor including at least one flexible elongated member bearing a plurality of spaced apart transverse bars, each of said transverse bars having a height substantially less than a height of said open vertical side of said elongated box; said conveyor being mounted on a plurality of pulleys, at least one of which is a drive pulley, each of said transverse bars having a lower edge; each of the lower edges of said transverse bars being in mating contact with said upper surface of bottom side of said vertical box along substantially all of said upper surface of said bottom side exposed to said residual pile by said open vertical side of said elongated box; said transverse bars in said lower elongated section being adapted to scrape an inside surface of said horizontal bottom side of said elongated box, so as to move said material from said residual pile towards a trap located in said horizontal bottom side of said elongated box, said trap being located just above said evacuation orifice in said silo;

said top side of said elongated box forming a portion of a canopy for limiting the quantity of said material from said residual pile which enters said box and which canopy prevents weight of any of said material atop said canopy from interfering with movement of material by said transverse bars beneath said canopy; whereby said material which has entered said elongated box is moved in generally plug flow, since the material higher than the height of said transverse bars rests upon material trapped between said transverse bars and, being protected from the weight of matter overlying said top side of said elongated box, said material higher than the height of said transverse bars is carried along with said material trapped between said transverse bars.

2. The device as claimed in claim 1 for removing a residual pile of granular or pulverulent matter from a silo, further comprising:

a pivot at the center of said circular floor and a driving wheel positioned at a furthermost extent of said conveyor from said pivot for supporting said box, said driving wheel cooperating with said means for removing material so as to move one end of said elongated box about said pivot, the other end of said elongated box being connected to said pivot; said elongated box having an elongated chamber beneath said top side for return passage of said transverse bars.

3. The device of claim 1 wherein said box further comprises:

means for deflecting said granular matter lying near said wall of said silo into said box.

4. The device of claim 1 wherein said box further comprises:

retractable means extending downwards along said canopy for obturating said open side of said box said retractable means adapted to be adjustable as a function of the angle formed by a side of said pile with the floor of said silo.

* * * * *